(12) United States Patent
Koehler et al.

(10) Patent No.: US 12,718,097 B2
(45) Date of Patent: Aug. 25, 2026

(54) METHOD FOR TRAINING A ML SYSTEM, ML SYSTEM, COMPUTER PROGRAM, MACHINE-READABLE STORAGE MEDIUM AND DEVICE

(71) Applicant: Robert Bosch GmbH, Stuttgart (DE)

(72) Inventors: Rolf Michael Koehler, Dettenhausen (DE); Pia Petrizio, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 624 days.

(21) Appl. No.: 18/256,924

(22) PCT Filed: Dec. 15, 2021

(86) PCT No.: PCT/EP2021/085951

§ 371 (c)(1),
(2) Date: Jun. 12, 2023

(87) PCT Pub. No.: WO2022/129203

PCT Pub. Date: Jun. 23, 2022

(65) Prior Publication Data

US 2024/0028891 A1 Jan. 25, 2024

(30) Foreign Application Priority Data

Dec. 15, 2020 (DE) ..................... 10 2020 215 945.9

(51) Int. Cl.
*G06N 3/08* (2023.01)
*G06N 3/048* (2023.01)

(52) U.S. Cl.
CPC ............... *G06N 3/08* (2013.01); *G06N 3/048* (2023.01)

(58) Field of Classification Search
CPC ................................ G06N 3/08; G06N 3/048
See application file for complete search history.

(56) References Cited

U.S. PATENT DOCUMENTS 11,900,238 B1 * 2/2024 Teig ........................ G06N 3/084
12,112,254 B1 * 10/2024 Teig ........................ G06N 3/084
2020/0012923 A1 * 1/2020 Ghosh .................... G06V 10/82
2022/0121927 A1 * 4/2022 O'Connor ............. G06F 9/5072
2022/0180199 A1 * 6/2022 Xu ........................ G06N 3/0495
2023/0141145 A1 * 5/2023 Hong ..................... G06N 3/082
706/26

(Continued)

FOREIGN PATENT DOCUMENTS

EP 3 748 453 A1 12/2020

OTHER PUBLICATIONS

International Search Report corresponding to PCT Application No. PCT/EP2021/085951, mailed Apr. 11, 2022 (German and English language document) (7 pages).

(Continued)

*Primary Examiner* — Stephen T Gundry
(74) *Attorney, Agent, or Firm* — Maginot, Moore & Beck LLP

(57) ABSTRACT

A method is for training an artificial neural network, for classifying sensor data, as a function of a first loss function and a second loss function. The first loss function is calculated as a function of an output of the artificial neural network. The second loss function is configured such that the output of the artificial neural network is essentially normalized.

8 Claims, 4 Drawing Sheets

(56) References Cited

U.S. PATENT DOCUMENTS

2023/0153615 A1* 5/2023 Xu .......................... G06N 3/08 706/15
2023/0153631 A1* 5/2023 Choi ...................... G06F 18/22 706/15
2023/0169348 A1* 6/2023 Gerdzhev ................ G06N 3/09 706/25
2023/0177641 A1* 6/2023 Song .................... G06N 3/0464 382/157
2023/0186100 A1* 6/2023 Nugteren ............... G06N 3/094 382/155
2023/0206036 A1* 6/2023 Labreuche ........... G06N 3/0499 706/15
2023/0206069 A1* 6/2023 Zhang .................... G06N 3/045 706/15
2023/0215159 A1* 7/2023 Deng ................... G06V 10/774 382/157
2023/0229897 A1* 7/2023 Komkov .............. G06N 3/0499 382/155
2023/0237333 A1* 7/2023 Shao .................... G06V 10/762 706/25
2023/0274138 A1* 8/2023 Riemenschneider .... G06N 3/08 706/25
2024/0233365 A9* 7/2024 Kilickaya ............ G06V 10/454
2025/0086457 A1* 3/2025 Choi ........................ G06N 3/08
2025/0117639 A1* 4/2025 Yao ........................ G06N 3/063
2025/0190758 A1* 6/2025 Sprechmann ............ G06N 3/02
2025/0200323 A1* 6/2025 Sohl-Dickstein ...... G06N 3/045
2025/0278458 A1* 9/2025 Nitsch ................. G06F 18/2431

OTHER PUBLICATIONS

Ma et al., "Normalized Loss Functions for Deep Learning with Noisy Labels", arxiv.org, Cornell University Library, Jun. 24, 2020, XP081709118 (13 pages).

Yue et al., "Design and Implementation of an Approximate Softmax Layer for Deep Neural Networks", 2019 IEEE International Symposium on Circuits and Systems (ISCAS), IEEE, Oct. 12, 2020 (5 pages).

Wang et al., "A Customized Convolutional Neural Network Design Using Improved Softmax Layer for Real-time Human Emotion Recognition", 2019 IEEE International Conference on Artificial Intelligence Circuits and Systems (AICAS), IEEE, Mar. 18, 2019 (5 pages).

Baumann et al., "Predicting Ego-Vehicle Paths from Environmental Observations with a Deep Neural Network", 2018 IEEE International Conference on Robotics and Automation (ICRA), IEEE, May 21, 2018 (8 pages).

* cited by examiner

35'
C
H
W
$L_{ce}$
30
3
35
C
H
W
C
H
W
*
C
1
1
37
-
H
W
35
36
$L_{add}$ 30
3
4
35
35"
C
H
W
$L_{ce}$
$L_{add}$
*
-
37
36
1
1

30
3
4
35
35'
35''
C
H
W
$L_{ce}$
$L_{add}$

METHOD FOR TRAINING A ML SYSTEM, ML SYSTEM, COMPUTER PROGRAM, MACHINE-READABLE STORAGE MEDIUM AND DEVICE

This application is a 35 U.S.C. § 371 National Stage Application of PCT/EP2021/085951, filed on Dec. 15, 2021, which claims the benefit of priority to Serial No. DE 10 2020 215 945.9, filed on Dec. 15, 2020 in Germany, the disclosures of which are incorporated herein by reference in their entirety.

The disclosure relates to a method for training a machine learning (ML) system, in particular an artificial neural network, especially for classification of sensor data.

Furthermore, the disclosure relates to a corresponding ML system, computer program, machine-readable storage medium, and a corresponding apparatus.

BACKGROUND

When training an artificial neural network, a common loss function (e.g., for a classification task) is the cross-entropy loss function. Typically, this loss function is preceded by a softmax function or layer that normalizes the incoming data by using the following function:

$$\sigma(z_j) = \frac{e^{z_j}}{\sum_{k=1}^{K} e^{z_k}}$$

The softmax function ensures that each value of the output data or output vector is between [0,1] and that the sum of all output vector values is 1.

This softmax function is often expensive or impossible to compute on inference hardware because it has exponential terms.

When running the trained neural network on the inference hardware, especially when running the forward pass on the inference hardware, the loss function computation is no longer needed. The softmax function could also be omitted, but this will result in different output ranges.

In particular, in a classification task (e.g., pixel-wise classification in semantic segmentation; the object classification of objects in bounding boxes), the normalized output is needed. For example, in pixel-by-pixel classification, each pixel is normalized individually. After this normalization, the class values can be compared between the pixels. If a semantic segmentation network outputs 5 classes, there will be a class score for each of these 5 classes. If these pixel values are not normalized, it is difficult to compare them between pixels because there is no guarantee that the scores for each pixel are in the same range. For the classification of bounding box objects, it is important that the scores are also normalized, since there is usually a threshold that excludes boxes in which there is not a single object class whose score exceeds a certain threshold.

SUMMARY

With this in mind, the disclosure creates a method for training an ML system as a function of a first loss function and as a function of a second loss function, where the first loss function is computed as a function of the output of the artificial neural network.

The method is characterized in that the second loss function is configured in such a way that the output of the artificial neural network is essentially normalized.

A machine learning (ML) system can be understood as a system for the artificial creation of knowledge from information, e.g., training data. Such a system "learns" from the matching of input data and the output data expected of that input data.

For example, an artificial intelligence can be counted among machine learning systems. In particular, artificial neural networks are among the machine learning (ML) systems.

An artificial neural network can be understood as a network of artificial neurons for information processing. Artificial neural networks essentially go through three phases. In an initial phase, a basic topology is specified, usually depending on the task. This is followed by a training phase in which the basic topology is taught to solve the task efficiently using training data. Within the training phase, the topology of the network can also be adjusted. The output data of the taught-in network then represent output data searched for according to the task.

The ML system of the disclosure, especially the artificial neural networks are suitable for classification of sensor data.

The sensor data can be data from sensors in the automotive sector. These include video, radar, lidar, ultrasound and infrared sensors as well as thermal imaging cameras.

In this regard, the method of the disclosure solves the problem of ensuring that the training of the ML system already normalizes the output of the ML system. This means, for example, that the sum of the output values along a dimension (in the case of a classification task or semantic segmentation to be solved by the ML system) is 1 or comes close to the value 1.

This is achieved in particular by introducing the second loss function.

According to one embodiment of the method according to the disclosure, an artificial neural network is applied to the output of the artificial neural network to approximate a softmax function to calculate the second loss function.

This embodiment has the advantage that the exponential terms can be omitted in a network for approximating a softmax function.

According to one embodiment of the method according to the disclosure, the output of the artificial neural network is added up along at least one dimension to calculate the second loss function.

According to one embodiment of the method according to the disclosure, the second loss function is configured in such a way that the output of the artificial neural network adds up to 1.

According to one embodiment of the method according to the disclosure, an artificial neural network is applied to the output of the artificial neural network to approximate a softmax function to calculate the first loss function.

According to one embodiment of the method according to the disclosure, a softmax function is applied to the output of the artificial neural network to calculate the second loss function.

This embodiment is characterized in that the second loss function is configured in such a way that the output of the artificial neural network approximates the output of the softmax function.

Another aspect of the disclosure is an ML system trained according to the method according to the disclosure.

A machine learning (ML) system can be understood as a system for the artificial creation of knowledge from information, e.g., training data. Such a system "learns" from matching input data and expected output data.

For example, an artificial intelligence can be counted among machine learning systems. In particular, artificial neural networks are among the machine learning (ML) systems.

The output of the ML system according to the disclosure can be used to control an actuator or generate a control signal to control an actuator.

In the present context, an actuator can be understood as a robot. Such a robot can be an at least partially automated vehicle or part of such a vehicle, such as a longitudinal or transverse control system.

For clarification, the method for training an ML system according to the disclosure may be part of a method comprising, in a first step, training an ML system and, in a second step, controlling an actuator or robot in response to the output of the ML system.

In another aspect of the disclosure, there is provided a computer program configured to carry out the method according to the present disclosure.

Another aspect of the disclosure is a machine-readable storage medium on which the computer program according to the disclosure is stored.

Another aspect of the disclosure is an apparatus configured to carry out the method according to the disclosure.

BRIEF DESCRIPTION OF THE DRAWINGS

Embodiments of the disclosure are explained in more detail in the following with reference to the accompanying drawings. The drawings show.

DETAILED DESCRIPTION

Figure 1:
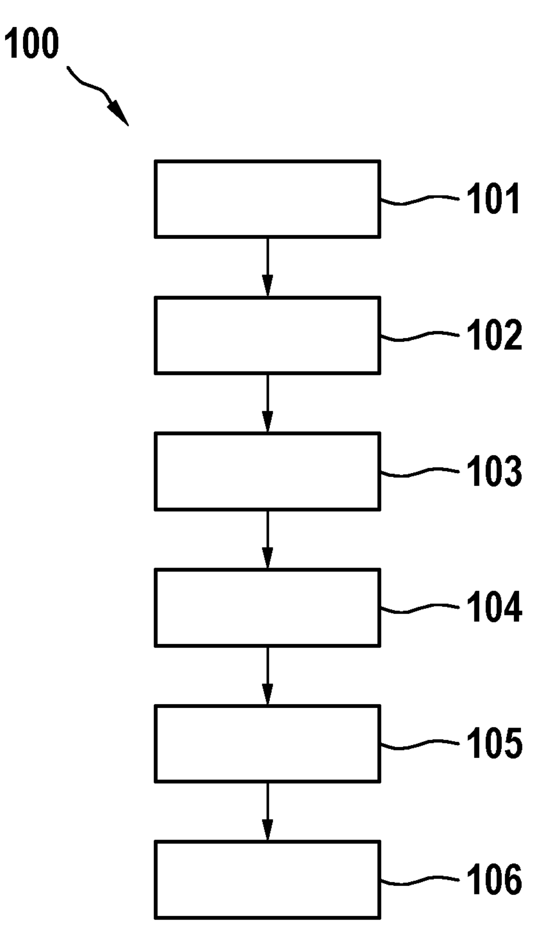
FIG. 1 a flowchart of an embodiment of the training method according to the disclosure.

FIG. 1 shows a flowchart of an embodiment of the training method (100) according to the disclosure. This flowchart describes one way to introduce a second loss function according to the disclosure into the training of an ML system to solve the task of the disclosure.

In step 101, the usual loss function for training an ML system for a classification task is computed. This common loss function can be, for example, the cross-entropy loss function.

In step 102, the output data of the network to be trained is recorded before applying a softmax function. This output data can be present in a tensor with the dimensions H×W×C.

In step 103, a 1×1 operation with a filter of dimensions 1×1×C is applied to the output data extracted in step 102. The coefficients of the filter may each be 1. This step for adding up the output data along the dimension C. The resulting feature map has the dimension H×W.

In step 104, a filter with dimensions H×W is subtracted from the resulting feature map. The coefficients of the filter have the value 1, therefore the filter is a unit matrix with the dimensions H×W.

In step 105, a norm, for example the L2 norm, is applied to the result of the subtraction of step 104.

In step 106, the network to be trained is trained as a function of a total loss function composed of the usual loss function according to step 101 and the result after applying the standard according to step 105. Furthermore, a correspondingly selected weighting factor w can be used to appropriately account for the result of the standard according to step 105 in the composition of the total loss functions.

It is conceivable that the weight factor remains constant throughout the training. Likewise, it is conceivable that the weight factor increases over training. Furthermore, it is conceivable that the weight factor is adjusted over the training in such a way that the influence of the result of the standard according to step 105 is stronger in the last training epochs.

Figure 2:
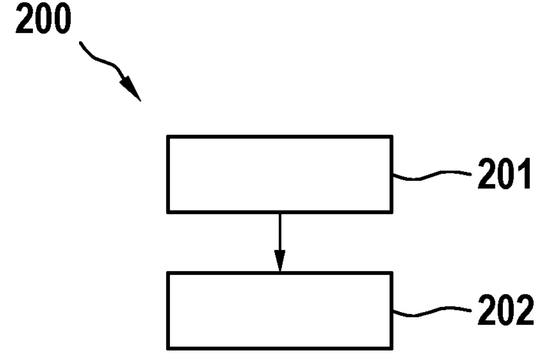
FIG. 2 a flowchart of an embodiment of the manufacturing method according to the disclosure.

FIG. 2 shows a flow chart of a method according to the disclosure.

In step 201, the ML system, e.g., an artificial neural network is trained according to the training method of the disclosure.

In step 202, the output of the trained ML system is used to control an actuator.

In this context, an actuator can be understood as a robot. Such a robot can be an at least partially automated vehicle or part of such a vehicle, such as a longitudinal or transverse control system.

Figure 3:
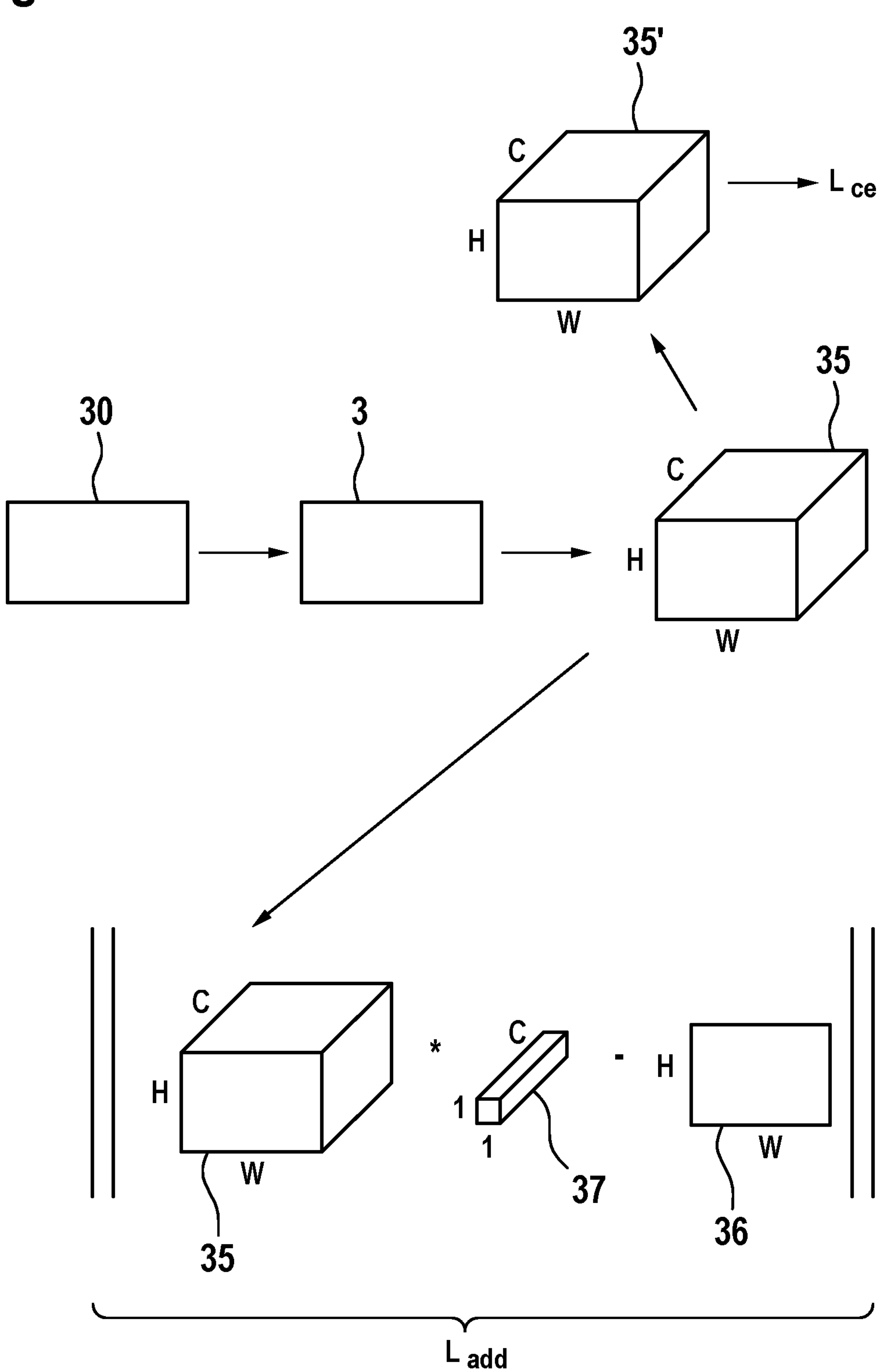
FIG. 3 a block diagram of a first embodiment of the disclosure.

FIG. 3 shows a block diagram of a first embodiment of the disclosure.

Input data 30 is supplied to the artificial neural network 3 to be trained. From the network 3, the input data 30 is converted into output data 35. In the representation, the output data 35 is represented as a tensor with dimensions H×W×C.

For example, if the network 3 is trained to classify image data. Thus, in the dimension C the possible classes can be plotted. In the dimensions H×W, a probability of belonging to the respective class can be entered for each pixel of the input data.

In order to feed the output data 35 to a first loss function $L_{ce}$ a softmax function is performed on the output data 35 to obtain normalized output data 35'.

The normalized output data is fed to a first loss function $L_{ce}$. For this purpose, a common loss function, such as the cross-entropy loss function, can be used as the first loss function $L_{ce}$.

The embodiment of the disclosure is based on the realization that for the subsequent inference of the trained network 3, the application of the softmax function can be omitted if, as part of the training, a second loss function $L_{add}$ is provided which is configured in such a way that the values of the output data 35 add up to 1 along the dimension C.

This is achieved by feeding the output data 35 to a second loss function $L_{add}$ without applying a softmax function, as shown in the block diagram of FIG. 3.

According to the representation, the second loss function $L_{add}$ is an L2 norm, represented by the double bars, which returns the distance to a unit matrix 36 of dimensions H×W.

For this purpose, a filter 37 with dimensions 1×1×C is applied to the output data 35. The filter is configured in such a way that the output data 35 is added up along the dimension C. For this purpose, the coefficients of the filter can be 1. It is also conceivable that the coefficients of the filter are also trained. For this purpose, it is advisable to initialize the coefficients with the value 1 first.

The introduction of the second loss function $L_{add}$ results in the normalization of the output data 35 of the trained network 3.

For inference, according to this embodiment, the trained network 3 is transferred to the inference hardware.

Figure 4:
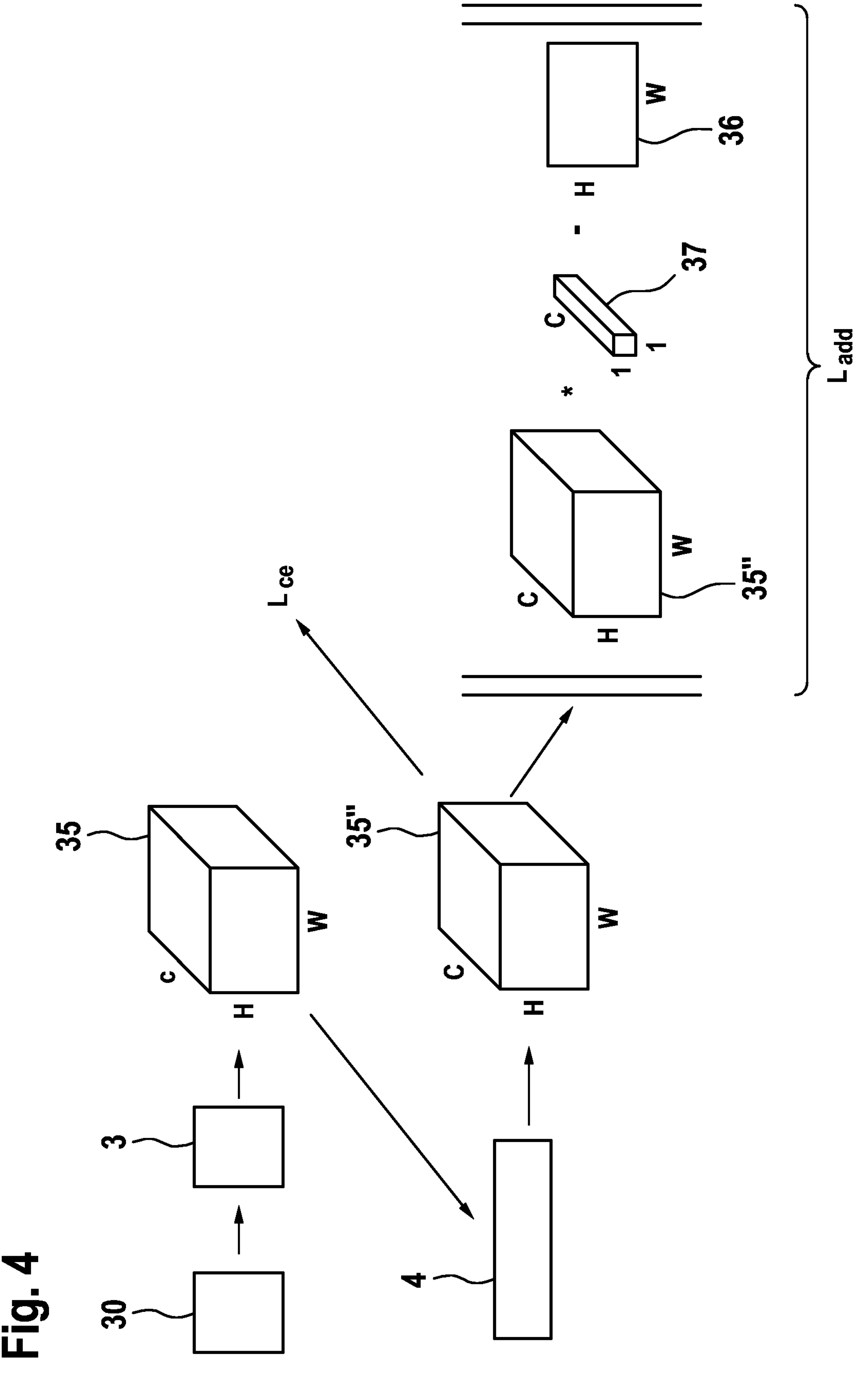
FIG. 4 a block diagram of a second embodiment of the disclosure.

FIG. 4 shows a block diagram of a second embodiment of the disclosure.

In the illustrated second embodiment, the application of the softmax function is omitted in the training of the artificial neural network 3.

To normalize the output data 35, it is fed to another artificial neural network 4, which is trained to output an approximation of the softmax function.

The approximated output data 35" is fed to both a first loss function $L_{ce}$ and a second loss function $L_{add}$. The first loss function $L_{ce}$ can be a common loss function, e.g., a cross-entropy loss function can be used.

According to the representation, the second loss function $L_{add}$ is an L2 norm, represented by the double bars, which returns the distance to a unit matrix 36 with the dimensions H×W.

For this purpose, a filter 37 with dimensions 1×1×C is applied to the approximated output data 35". The filter is configured in such a way that the approximated output data 35" is added up along the dimension C. For this purpose, the coefficients of the filter can be 1. It is also conceivable that the coefficients of the filter are also trained. For this purpose, it is advisable to initialize the coefficients with the value 1 first.

The introduction of the second loss function $L_{add}$ results in normalizing the approximated output data 35" of the trained network 3.

According to this embodiment, the trained network 3 and the artificial neural network for approximating a softmax function 4 are transferred to the inference hardware.

Figure 5:
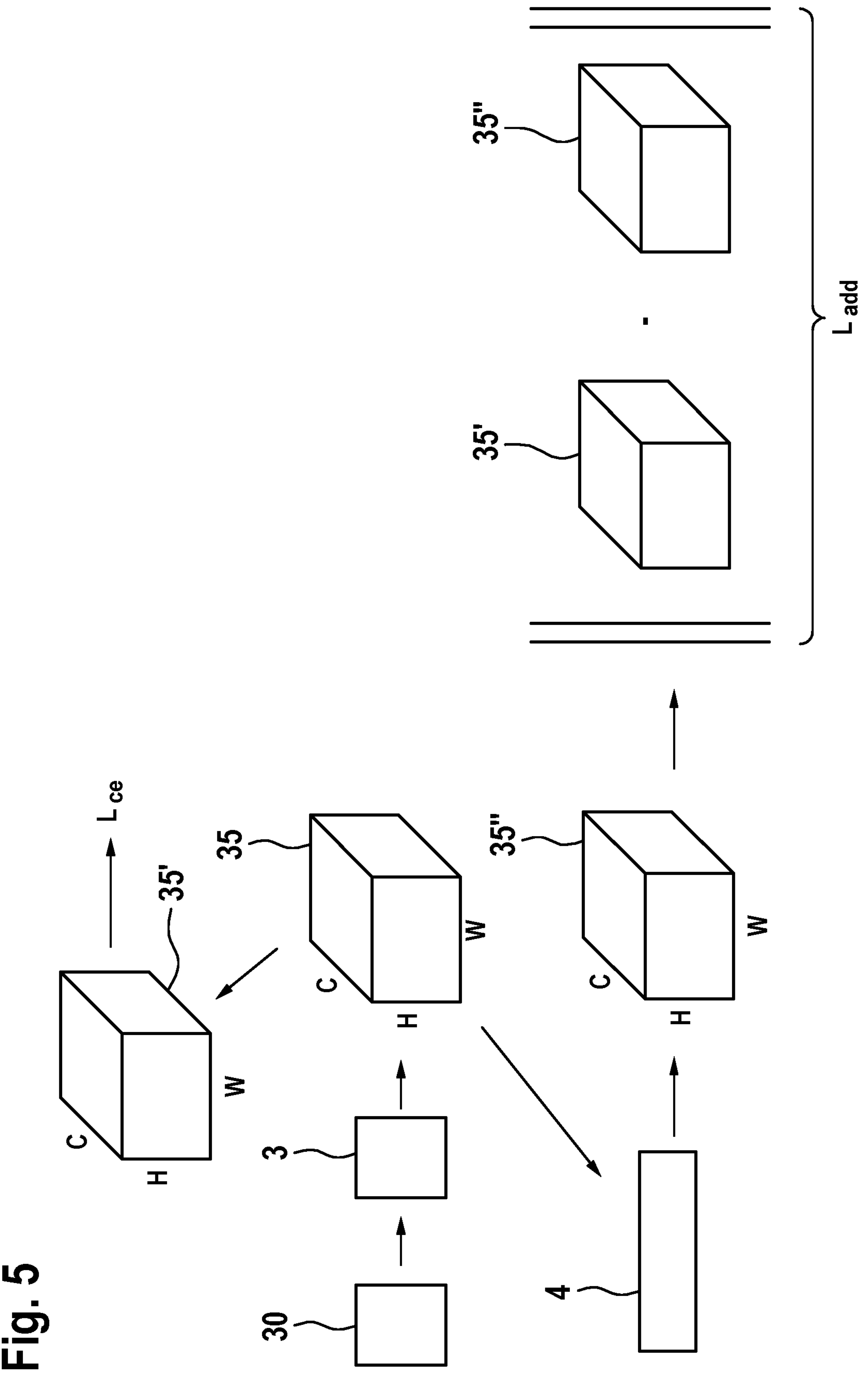
FIG. 5 a block diagram of a third embodiment of the disclosure.

FIG. 5 shows a block diagram of a third embodiment of the disclosure.

According to this embodiment, a softmax function is applied to output data 35 of the network 3 to be trained for feeding to first loss function in order to obtain normalized output data 35'.

For this purpose, a common loss function, such as the cross-entropy loss function, can be used as the first loss function $L_{ce}$.

For feeding to a second loss function $L_{add}$, the output data 35 is fed to another artificial neural network 4 trained to output an approximation of the softmax function.

According to the embodiment shown, in addition to the output data 35" thus approximated, the normalized output data 35', which is also fed to the first loss function $L_{ce}$, is also fed to the second loss function $L_{add}$. The second loss function $L_{add}$ may be the L2 norm as in the previously described embodiments. Presently, this is used to cause the approximated output data 35" to approximate the normalized output data 35'.

To normalize the output data 35, it is fed to another artificial neural network 4, which is trained to output an approximation of the softmax function.

According to this embodiment, the trained network 3 and the artificial neural network for approximating a softmax function 4 are transferred to the inference hardware.

The invention claimed is:

1. A method for training an artificial neural network to classify sensor data, comprising:

determining an output of the artificial neural network;

calculating a first loss using a first loss function based on the output of the artificial neural network;

calculating a second loss using a second loss function based on the output of the artificial neural network, the second loss being configured to cause the artificial neural network to generate normalized outputs; and training, based on the first loss and the second loss, the artificial neural network to classify sensor data.

2. The method according to claim 1, the calculating the second loss further comprising:

calculating the second loss by applying a further artificial neural network to the output of the artificial neural network, the further artificial neural network being configured to approximate a softmax function.

3. The method according to claim 2, wherein:

the softmax function is applied to the output of the artificial neural network to compute the first loss using the first loss function, and the second loss function is further configured to cause the artificial neural network to generate normalized outputs that approximate an output of the softmax function.

4. The method according to claim 1, the calculating the second loss further comprising:

calculating the second loss function by adding up the output of the artificial neural network along at least one dimension.

5. The method according to claim 1, wherein the second loss function is further configured to cause the artificial neural network to generate normalized outputs that add up to 1.

6. The method according to claim 1, the calculating the first loss further comprising:

calculating the second loss by applying a further artificial neural network to the output of the artificial neural network, the further artificial neural network being configured to approximate a softmax function.

7. The method according to claim 1, wherein a computer executes a computer program to perform the method.

8. The method according to claim 7, wherein the computer program is stored on a non-transitory machine-readable storage medium.

* * * * *